United States Patent [19]

Manuel

[11] 4,034,132
[45] July 5, 1977

[54] PROPYLENE POLYMER ADHERED TO ENAMEL COATED METAL SURFACE

[75] Inventor: Ernesto H. Manuel, Park Forest, Ill.

[73] Assignee: The Continental Group, Inc., New York, N.Y.

[22] Filed: Sept. 25, 1975

[21] Appl. No.: 616,530

[52] U.S. Cl. .................................. 428/36; 428/35; 428/460; 428/461; 220/64; 220/75; 220/81 R; 220/265; 220/359; 428/416; 427/410; 427/374 C; 156/334; 156/69; 156/218; 156/309; 156/315

[51] Int. Cl.² .................. B65D 25/14; C09J 3/14

[58] Field of Search ............ 428/416, 461, 463, 35, 428/36; 220/64, 80 R, 75, 76, 269, 81 R, 265, 359; 156/334, 218, 69, 309, 315; 427/410, 374 C

[56] References Cited

UNITED STATES PATENTS

| | | | |
|---|---|---|---|
| 3,616,047 | 10/1971 | Kehe | 156/334 |
| 3,650,809 | 3/1972 | Gilliam et al. | 428/523 X |
| 3,682,693 | 8/1972 | Khelghatian et al. | 428/461 |
| 3,736,284 | 5/1973 | Fitko | 428/461 X |
| 3,928,687 | 12/1975 | Wada et al. | 428/461 |

*Primary Examiner*—Ralph S. Kendall
*Attorney, Agent, or Firm*—Paul Shapiro; Joseph E. Kerwin; William A. Dittman

[57] ABSTRACT

The adhesion of propylene polymer layers to enamel coated metal surfaces is improved by incorporating an adhesion promoting amount of a carboxyl modified polypropylene resin in the enamel.

11 Claims, 4 Drawing Figures

PROPYLENE POLYMER ADHERED TO ENAMEL COATED METAL SURFACE

BACKGROUND OF THE INVENTION

1. Field of Invention

This invention relates generally to adhering a propylene polymer layer to an enamel coated metal surface and more particularly to effecting a heat seal bond between the surfaces.

2. The Prior Art

Easy opening containers are known to the art. These containers are generally formed of metal and are provided with at least one pour opening. The pour opening generally occupies only a portion of the end panel of the container. Heretofore, the pour opening has generally been formed by scoring to define a tear strip. A pull tab is attached to the tear strip, and upon the application of a force, the pull tab is operative to separate the tear strip from the panel along the score line.

Although easy opening containers have been readily accepted by the public, deficiencies still remain in this type of container. One of these deficiencies is that the removable tear strip which is torn from the end panel in the opening of the can has sharp edges, and when thrown on the ground or otherwise improperly disposed of, remains as a nuisance which presents a cutting hazard to the public.

It has been proposed, e.g., U.S. Pat. No. 3,616,047, to replace the metal tear strip with a plastic layered closure member to eliminate the cutting hazard as the removed portion will not have sharp edges. The closure member fabricated entirely from a thermoplastic resin, such as polypropylene or a laminate of the resin and a metal foil such as aluminum or steel is heat sealed to the surface of an enamel coated end panel having at least one preformed opening, the enameled surface of the panel having been coated with a heat activatable, bond promoting layer containing a carboxyl modified polypropylene resin.

Although the plastic containing closures of U.S. Pat. No. 3,616,047 could be effectively bonded to the metal can ends, problems arose in the application of the carboxyl modified polypropylene layer to the enameled metal surface.

When the carboxyl modified polypropylemne resin is utilized as an adhesion promoting layer for bonding the propylene polymer layer of a closure member to an enamel coated metal can end, the carboxyl modified polypropylene resin is applied as a disperision in a volatile organic solvent such as kerosene. The carboxyl modified polypropylene resin used to prepare the dispersion generally has a particle size of 0.1 to 5 microns and is at the present time a relatively expensive resin material. Although only small amounts of the modified resin are required in the adhesion promoting layer, the application of the modified resin in a dilute dispersion, e.g., 10% solids is unsatisfactory as such dilute dispersions do not have the required physical properties such as viscosity and flow out, which are required for the application of the coating dispersion using conventional coating equipment, e.g. as by roll coating. To obtain a coating dispersion having the physical properties necessary for commercial coating application, polypropylene resin powders of approximately the same particle size range, e.g. 0.1–5 microns are incorporated in the dispersion to raise the solids content to about 20% whereby the dispersion has the flow and viscosity characteristics required in commercial coating methods. One drawback to the use of polypropylene resins of such particle size is that the submicron size resin is difficult to manufacture and is presently in limited commercial supply.

SUMMARY OF THE INVENTION

In accordance with the present invention, a propylene polymer layer is heat sealed to a metal surface coated with an enamel coating having incorporated therein an adhesion promoting amount of a carboxyl modified polypropylene resin.

The practice of the present invention eliminates the necessity for the application of special polypropylene/carboxyl modified polypropylene dispersions to effect the heat sealing of propylene polymer layers to enameled metal surfaces.

By the practice of the present invention, propylene polymer layers can be bonded directly to enamel coated metal surface without the imposition of a separate adhesion promoting layer between the propylene polymer layer and the enamel coated metal layer as has been the practice of the prior art.

PREFERRED EMBODIMENTS

Figure 1:
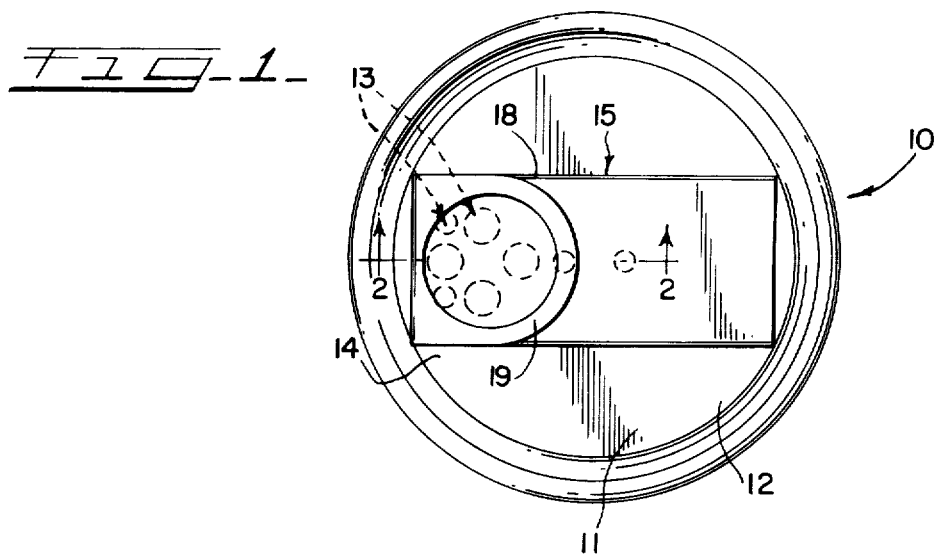
FIG. 1 is a top plane view of a container having an easy opening structure provided with a laminated closure member containing a propylene polymer layer.
Figure 2:
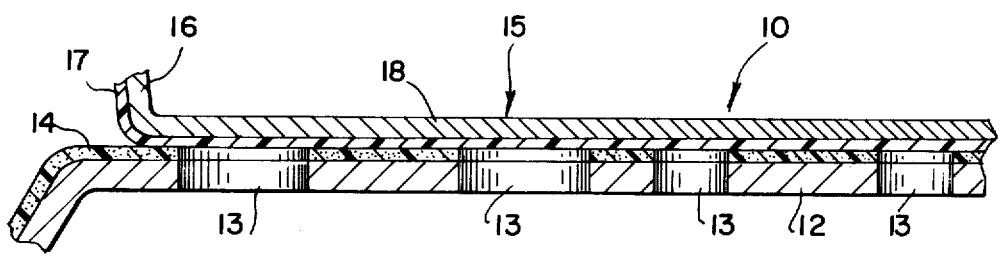
FIG. 2 is an enlarged cross sectional view taken generally along the lines 2—2 of FIG. 1 showing the closure member secured to the end panel surface in accordance with the present invention.

The carboxyl modified polypropylene which is utilized in the practice of the present invention is prepared by grafting and unsaturated dicarboxylic acid or anhydride onto a polypropylene backbone using high energy radiation or a peroxy catalyst as described in British Pat. No. 1,020,740. Unsaturated dicarboxylic acids or anhydrides which can be employed to prepare the carboxyl modified polypropylene resins include maleic, tetrahydrophthalic acid, fumaric acid, itaconic, nadic, methyl nadic and their anhydrides, maleic anhydride being preferred.

The amount of unsaturated dicarboxylic acid or anhydride which can be grafted onto the polypropylene backbone ranges from about 0.05 to about 10 percent by weight based on the total weight of the grafted polymer and generally, the amount of grafted dicarboxylic acid or anhydride ranges from about 0.5 to about 5.0 percent.

When the carboxyl modified polypropylene resin is utilized as an adhesion promoting adjuvant for enamel coatings, the resin can be of any particle size and generally has a particle size of 0.05 to 50 microns and preferably a particle size of 35 to 40 microns.

The enamel coating in which the carboxyl modified polypropylene resin is incorporated is generally an epoxy resin coating formulation containing a heat activatable aminoplast cross-linking resin.

The aminoplast condensates employed in the present invention are urea-aldehyde and triazine aldehyde resins and alcohol modified derivatives thereof, that is, alkylated amino resins wherein the alkyl radical contains from 2 to 8 carbon atoms. Such aminoplast resins are the reaction products of aldehydes, for instance formaldehyde, acetaldehyde and the like, with urea, substituted ureas, thioureas, ethylene urea, melamine, benzoquanamine, acetoguanamine and the like. The resulting methylol substituted products are etherified with alcohols, for example isopropanol, butanol and 2-ethyl hexanol, in order to obtain stability and organic solubility. Such organic soluble aminoplast resins are contemplated for use in this invention and butylated urea formaldehyde resins are preferred for use in the practice of the present invention.

The epoxy resins employed in the invention of this application are the polymeric reaction products of polyfunctional halohydrins with polyhydric phenols having the structural formula:

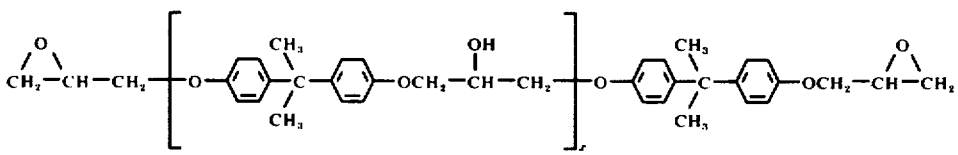

wherein X represents the number of molecules condensed. Typical polyfunctional halohydrins are epicholorohydrin, glycerol dichlorohydrin, and the like. Typical polyhydric phenols are resorcinol and a 2,2-bis(4-hydroxyphenyl)alkane, the latter resulting from the condensation of phenols with aldehydes and ketones, including formaldehyde, acetaldehyde, propionaldehyde, acetone, methyl ethyl ketone and the like, which result in such compounds as 2,2-bis (4-hydroxyphenyl)propane and like compounds. These epoxy resins normally contain terminal epoxy groups but may contain terminal epoxy groups and terminal hydroxyl groups.

The molecular weight of the epoxy resins may be controlled by the relative proportions of the reactants as well as by the extent to which the reaction is carried.

In the present invention, those epoxy resins which are of relatively high molecular weight are utilized in preparing the enamel coatings. Generally, epoxy resins having an average molecular weight in the range of 1400 to 5000 may be used.

Epoxy resins are available commercially. Preferred examples are EPON 1004 and EPON 1007, products of Shell Chemical Company which are the condensation products of epichlorhydrin and Bisphenol A (dihydroxy-diphenyl-dimethyl methane) and have a respective epoxy assay of 875 to 1025 and 2500 to 4000 grams of sample per gram mole of epoxy group (gram/-gram mole). The average molecular weight of an epoxy resin is approximately twice the epoxy assay.

The enamel coating compositions of the present invention are comprised of about 70 to about 90 percent by weight of the epoxy resin, preferably about 75 to about 85 percent, and about 5 to about 20 percent by weight of the aminoplast resin, preferably about 10 to 15 percent by weight of the aminoplast resin and about 0.5 to 5 percent by weight of the carboxyl modified polypropylene resin, preferably about 1.0 to about 3 percent by weight of the carboxyl modified polypropylene resin.

In preparing the enamel compositions of the present invention, the epoxy resin and aminoplast resin are dissolved in a solvent blend, such diisobutylketone, a mixture of ketones and aromatic hydrocarbons until these components are completely mixtures, Suitable ketones which can be employed in the practice of the present invention include methyl ethyl ketone, isophorone, cyclohexanone, diacetone alcohol and dissobutylketone. Aromatic hydrocarbon solvents include benzene, toluene, xylene, and commercially available aromatic naphtha mixture, such as Solvesso 100 or 150 and butyl cellulosolve.

To the solvated resin are then added the carboxyl modified polypropylene resin predissolved or predispersed in a solvent used for solubilizing the epoxy resin or in a compatible aliphatic solvent such as kerosene, and these components are mixed until a homogenous mixture is obtained.

The enamel compositions of this invention can be satisfactorily applied at a solids content ranging from about 20 to about 70% by weight, based on the total weight of the liquid coating composition. Generally, a solids content of 35 to 50% by weight is preferred.

The enamel coating containing the adhesion promoting carboxyl modified polypropylene resin can be satisfactorily applied by any of the conventional methods employed in the coating industry. However, for coating of sheet metal used in container manufacture, gravure or direct roller coating are preferred methods, as the desired coating weight is easily and conveniently applied in a single coat. Spraying, dipping and flow coating are also useful methods of applying the coating dispersion.

After applying the enamel coating, it is cured and hardened by heating the coated substrate at a temperature of about 350° to about 600° F for a period of about 20 minutes to about 1 minute, the preferred conditions being 8–10 minutes at 400° F.

The preferred coating weight for coating metal ends to which a propylene polymer closure may be heat sealed is in the range of 2.5 to 10.0 milligrams of dry coating per square inch of substrate surface to provide an enameled surface to which a propylene polymer layer can be heat sealed.

Propylene polymer layers which may be bonded to the enamel coated surface in accordance with the practice of the present invention include polypropylene, and propylene/ethylene copolymers containing about 1 to 10% ethylene.

The propylene polymer layer is bonded to carboxyl modified polypropylene coated surface by heat sealing at a temperature range of about 350° to 450° F and preferably at a temperature of 375° to 400° F. Heat sealing may be accomplished by any means known to the art, such as hot platen press or metal jaws heated by resistance wire or by induction heating, using dwell times varying from 0.1 seconds to 5 seconds.

After the propylene polymer layer is heat sealed and bonded to the enamel coated metal surface, the assembly is allowed to cool to ambient temperature.

Referring now to the drawings, and in particular to FIG. 1, there is shown a container top end assembly 10 of a container. The end assembly 10 is made of metal such as tin plate, tin-free steel or aluminum. The end assembly 10 comprises a central panel 11 having a bead formed adjacent the outer periphery from which there depends a peripheral flange 12. The peripheral flange 12 is curled and double seamed with and outwardly extending flange at the upper end of a container body in the usual manner.

The panel 11 in the embodiment illustrated in the drawing is shown with a plurality of pour openings 13 through which the contents of the container are poured.

It is to be understood that the openings 13 may assume any configuration, and is not limited to the pour opening arrangement shown in the drawings.

The top surface of the end assembly 10 is coated with a layer of a thermosetting enamel coating, such as an epoxy-urea/formaldehyde resin 14 having incorporated therein an adhesion promoting carboxyl modified polypropylene resin, such as a polypropylene/maleic anhydride graft copolymer. Peelably heat sealed to the enamel lay 14 is a laminated closure member 15 constructed of an aluminum foil outer layer 16 and a polypropylene inner layer 17. The closure member 15 has a sealing flap 18 for closing the openings 13. Integrally extending from the sealing flap 18 is a pull ring porton 19.

The peelable heat sealed bond that is formed due to the presence of the carboxyl modified polypropylene resin in the enamel layer 14 permits the flap 18 to be heat sealed to the metal end panel and thereafter separated cleanly from the metal end by the application of a pulling force at the ring portion 19. Preferably, the pull ring portion 19 is formed with an opening size to receive the finger of a user. The heat to achieve bonding is preferably applied by induction heating of the metal surface. In this manner, the sealing flap 19 is firmly heat sealed but peelably fixed about the openings 13 and remains adhered thereto until pulled and separated from the container end surface.

In addition to promoting the adhesion of propylene polymer coated closures to enamel coated container ends, the method of the present invention has other applications in the container fabrication art and the metal adhesion art generally.

Another example of the use of the method of the present invention in the container fabrication art is in the fabrication of container bodies. In one method of metal container body manufacture, a sheet of enamel coated metal is formed into a tubular shape and the edges of the blank are brought together in lapped relation. A sealed joint is made by interposing a bonding agent between the laps and then heating the joint and pressing the laps together to obtain the desired bond of the metal section. Propylene polymers have not been utilized as adhesive materials due to their poor bonding adhesion to enameled metal surfaces. By modifying the enamel coating applied to the blank with a carboxyl modified polypropylene resin in accordance with the present invention, the adhesion of propylene polymers to the enameled metal surface is improved to a degree that the propylene polymer can be used as a bonding agent for the lapped portions of the container body.

Figure 3:
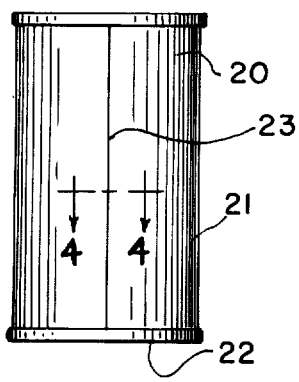
FIG. 3 is a elevational view of a container having a lapped side seam.
Figure 4:
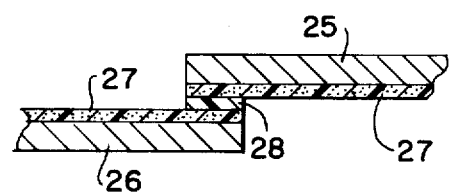
FIG. 4 is a cross-sectional view taken along the lined 4—4 of FIG. 3 showing the sideseam in detail.

Thus, in FIG. 3, there is shown a container 20 having body 21, and end 22 and longitudinal a side seam 23. FIG. 4 shows the side seam 23 in detail which is composed of metal layers 25, 26 having applied thereto an enamel coating 27 applied thereto, the enamel coating having incorporated therein an adhesion promoting amount of a carboxyl modified polypropylene resin. The seam 23 has a laminate structure consisting of the overlapped edges of enamel coated metal surfaces 25, 26 having a propylene polymer layer 28 interposed therebetween bonding the overlapped edges together.

To illustrate the manner in which the present invention may be carried out, the following Examples are given. It is to be understood, however, that the Examples are for the purpose of illustration, and the invention is not to be regarded as limited to any of the specific materials or conditions recited therein.

EXAMPLE I

An epoxy resin based enamel coating formulation was prepared composed of a 40% by weight solids consisting of 80 parts of the digycidyl ether of Bisphenol A and 20 parts of a butylated urea formaldehyde suspended in an organic solvent mixture of approximately equal parts of xylene, methyl isobutyl ketone diacetone alcohol and butyl alcohol.

To the enamel coating formulation was added Hercoprime A-35 (trademark) in the form of a 10% dispersion in kerosene. Hercoprime A-35 is a maleic anhydride modified polypropylene resin having an inherent viscosity of about 1.7, a carboxyl content of 0.5 to 1.0%, a particle size range of 35 to 40 microns and a specific gravity of 0.9. The final solids content of the modified enamel formulation consisted of 98.5% by weight of the epoxy resin/urea formaldehyde enamel coating solids and 1.5% by weight of the Hercoprime A-35. In adding the Hercoprime dispersion to the enamel coating formulation Hercoprime dispersion was slowly added to the epoxy enamel formulation at ambient room temperature (25° C) and with vigorous stirring. Stirring of the modified enamel suspension was continued for another 5 minutes or until a homogeneous mixture had been achieved.

The Hercoprime modified enamel formulation was applied by means of a laboratory coating rod to the surface of a sheet of tin-free steel at a coating weight of 2.5 mgs/in$^2$. After application of the enamel coating formulation, the wet sheet was baked at 205° C for 8 minutes in a hot-air oven to volatilize the solvent and cure the enamel to a hard film. Strips 4 inches $\times$ 1 inch were cut from the coated sheet to test the bonding characteristics of the enamel. A similar sized strip of a polypropylene/aluminum foil laminate constructed of 4 mil aluminum foil having adhered thereto a 2 mil polypropylene resin having a melt index 0.5 and a density of 0.905 was heat sealed to the enamel coated steel strip with the polypropylene layer in direct contact with the enamel surface using a laboratory Sentinel heat sealer. Bonding was achieved with the sealer set at 205° C, 40 pounds per square inch jaw pressure and a dwell time of 4 seconds. The heat sealed structure was then allowed to cool to ambient room temperature.

The heat sealed structure was then tested to determine the peel force required to separate polypropylene coated aluminum foil from the enamel coated strip. The test was performed using an Amthor peel tester which applied a constant strain rate of 12 lineal inches per minutes on the structure. The peel forces required to effect separation of the heat sealed layers was determined to be 3.4 pounds/inch (lbs/in).

For purposes of comparision, the procedure of Example I was repeated with the exception that the carboxyl modified polypropylene resin was not incorporated in the enamel coating and no measurable bond was obtained in the heat sealed structure.

EXAMPLE II

A sheet of tin-free steel was coated with an epoxy resin based enamel coating modified with Hercoprime in accordance with the procedure of Example I. Strips of the enamel coated steel were bonded together by interposing a film of polypropylene between the enamel coated surfaces and heat sealing under the conditions of Example I. The peel force required to effect separation of the heat sealed strips was determined to be 66 lbs/in.

What is claimed is:

1. A method of bonding a propylene polymer to a metal surface which comprises:
   a. applying to the metal surface an enamel coating containing a solids mixture of about 70 to about 90% by weight of an epoxy resin, about 5 to about 25% by weight of a urea formaldehyde resin and about 0.1 to 5% by weight of a carboxyl modified polypropylene resin which is the reaction product of polypropylene and an unsaturated dicarboxylic acid or anhydride containing about 0.1 to about 5.0% by weight carboxyl groups,
   b. baking the enamel coating to cure and harden the coating,
   c. heat sealing a propylene polymer layer to the hardened enamel coating metal surface and then,
   d. cooling the heat sealed assembly to ambient temperature.

2. The method of claim 1 wherein the enamel coated metal surface having the propylene polymer sealed thereto is heat sealed to a second metal surface also having the enamel coating applied thereto.

3. The method of claim 1 wherein the metal surface is steel.

4. The method of claim 1 wherein the propylene polymer is polypropylene.

5. The method of claim 1 wherein the unsaturated anhydride is maleic anhydrde.

6. A method of securing metal substrates together comprising,
   a. applying to the metal substrate an enamel coating containing a solids mixture of about 70 to about 90% by weight of an epoxy resin, about 5 to about 20% by weight of an urea formaldehyde resin and about 0.1 to about 5% by weight of a carboxyl modified polypropylene resin which is the reaction produce of polypropylene and an unsaturated dicarboxylic acid or anydride containing about 0.1 to about 5.0% by weight carboxyl groups,
   b. baking the enamel coating to cure and harden the coating,
   c. positioning a propylene polymer layer between portions of the enamel coated metal substrate to be secured,
   d. heating the propylene polymer layer to soften the layer and then
   e. applying to the metal substrate portions sufficient pressure to bond the metal substrates to the propylene polymer layer.

7. The method of claim 6 wherein the propylene polymer is polypropylene.

8. The method of claim 6 wherein the metal substrate is steel.

9. A laminate comprised of overlapped metal substrates coated with an enamel coating comprised of a solids mixture of about 70 to about 90% by weight of an epoxy resin, about 5 to 25 percent by weight of an urea formaldehyde resin and about 0.1 to about 5% by weight of a carboxyl modified polypropylene which is the reaction product of polypropylene and an unsaturated dicarboxylic acid or anhydride containing about 0.1% to about 5.0% by weight carboxyl groups, the substrate being bonded with a propylene polymer interposed between the opposed enamel coated substrates.

10. An easy opening container member comprising a container end panel having a preformed opening, the end panel having applied thereto an enamel coating a removable closure member closing the opening, the closure member including a sealing surface of a propylene polymer heat sealed to the enamel coated surface comprised of a solids mixture of about 70 to about 90% by weight of an epoxy resin, about 5 to 25 percent by weight of an urea formaldehyde resin and about 0.1 to about 5% by weight of a carboxyl modified polypropylene resin which is the reaction product of a polypropylene and an unsaturated dicarboxylic acid or anhydride containing about 0.1 to about 5.0% by weight carboxyl groups.

11. A tubular sheet metal can body having a longitudinally extending lap seam, the opposed surface portions of the sheet metal included within said side seam having adhered thereto an enamel coating and a propylene polymer layer securing together the opposed surface portions of the enameled coated sheet, the enamel coating having incorporated therein a solids mixture of about 70 to about 90% by weight of an epoxy resin, about 5 to 25 percent by weight of an urea formaldehyde resin and about 0.1 to about 5% by weight of a carboxyl modified polypropylene resin which is the reaction product of polypropylene and an unsaturated dicarboxylic acid or anhydride containing about 0.1 to 5.0% by weight carboxyl groups.

* * * * *